United States Patent [19]

Hartman et al.

[11] Patent Number: 5,276,762
[45] Date of Patent: Jan. 4, 1994

[54] MAGNETIC HOLDING METHODS FOR OPTICAL FIBER I/O ASSEMBLY

[75] Inventors: Davis H. Hartman, Phoenix; Christopher K. Y. Chun, Mesa; Michael S. Lebby, Chandler; Melissa Denvir, Mesa, all of Ariz.

[73] Assignee: Motorola, Inc., Schaumburg, Ill.

[21] Appl. No.: 844,028

[22] Filed: Mar. 2, 1992

[51] Int. Cl.⁵ ............................................. G02B 6/36
[52] U.S. Cl. ..................................... 385/137; 385/57; 385/65; 385/135
[58] Field of Search ................ 385/135, 137, 57, 60, 385/68, 98, 65, 83

[56] References Cited

U.S. PATENT DOCUMENTS 4,062,620 12/1977 Pirolli .................... 385/57
4,930,854 6/1990 Albares et al. ............ 385/49

Primary Examiner—John D. Lee
Assistant Examiner—Phan Thi Heartney
Attorney, Agent, or Firm—Eugene A. Parsons

[57] ABSTRACT

A method of coupling an optical fiber to a desired optical input wherein the optical fiber is pre-coated with a magnetic material and then placed in an elongated groove in a base, one end of which groove terminates at the desired optical input. A magnetic field is applied to hold the pre-coated optical fiber firmly in place while it is permanently mounted by some means such as soldering or an adhesive.

8 Claims, 1 Drawing Sheet

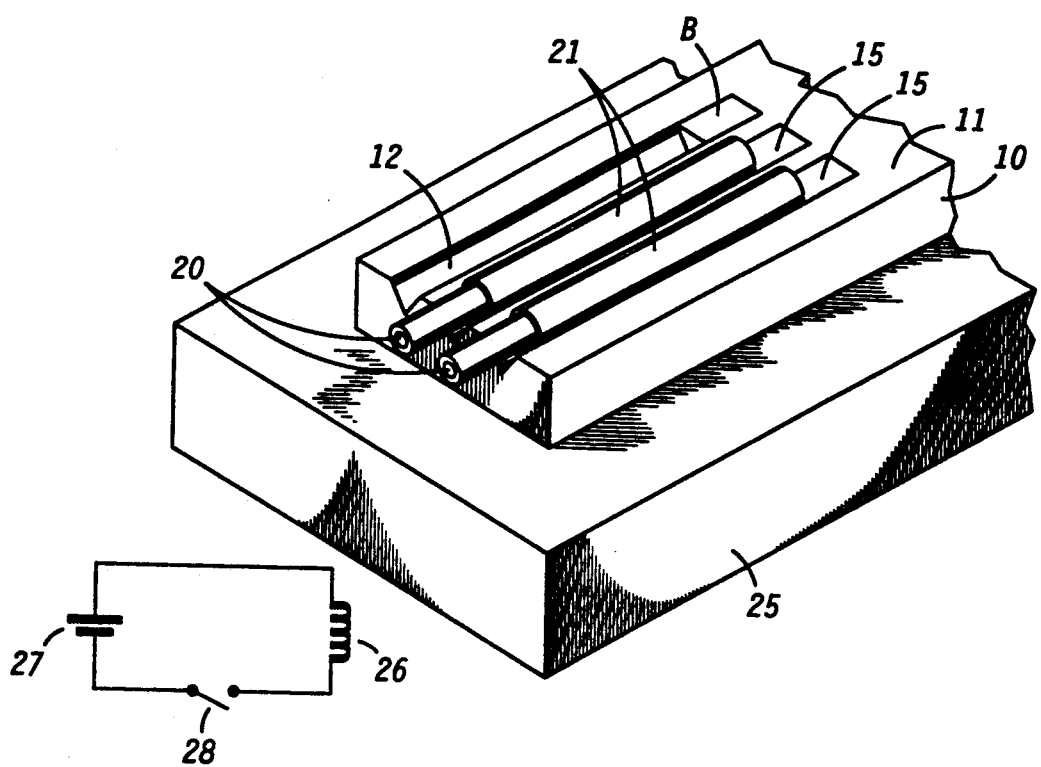

MAGNETIC HOLDING METHODS FOR OPTICAL FIBER I/O ASSEMBLY

BACKGROUND OF THE INVENTION

Multi-chip modules are rapidly becoming the package medium of choice for high density packaging of ICs. These modules allow for tight IC pitch and high interconnect density.

Methods for achieving I/O with multi-chip modules (MCM) include enclosing in leadless packages, solder bumping from the MCM to a mother-board, or TAB bonding. Provisioning of means for optical fiber I/O is also necessary where optically interconnected modules are used. Examples of applications for optical fiber use include main frame computers, work stations, broadband telephone-based switching stations (where SONET and ATM are implemented), etc.

To make optical fiber I/O in multi-chip modules practical from a manufacturing point of view, methods for separating tight optical tolerances from electrical tolerances must be devised. One method of achieving this goal involves the fabrication of optical fiber device sub-modules, which are pre-fabricated, tested and qualified and then placed in the MCM environment.

The fabrication of a pre-qualified module involves placing one or more polished and/or surface cleaved optical fibers into a module, alignment of the fiber with components of the module and fixing the optical fibers in place. The process must be done automatically to be cost effective.

SUMMARY OF THE INVENTION

The above described problems and others are substantially solved by means a method of operatively coupling an optical fiber to a mating structure including the steps of providing a base with the mating structure positioned thereon, providing an optical fiber to be coupled to the mating structure, pre-coating a portion of the optical fiber adjacent an end thereof with a magnetic material, placing the pre-coated portion of the optical fiber on the base with the end abutting the mating structure, applying a magnetic force to the base, generally perpendicular to the optical fiber to hold the optical fiber in place, and fixing the optical fiber in coupling engagement with the mating structure.

BRIEF DESCRIPTION OF THE DRAWING

The single FIGURE is a view in perspective of an embodiment of the present invention.

DESCRIPTION OF THE PREFERRED EMBODIMENTS

Referring to the FIGURE, a base 10 is provided with a first, or upper, major surface 11 and a second opposite (lower) major surface. Surface 11 has a plurality of elongated grooves 12 formed therein, each of which extends to the front edge of base 10 with the opposite end terminating in an optical input/output of a mating structure 15. Each groove 12 is adapted to receive an optical fiber 20 therein with the end of optical fiber 20 butting against the optical input/output of mating structure 15 at the termination of groove 12. Base 10 is, for example, a semiconductor substrate having mating structures 15 formed therein, a simple connection for components, or, in some instances simply a holding block. Mating structures 15 are, for example, semiconductor lasers, e.g. vertical cavity surface emitting lasers which emit light directly into optical fiber 20, photo diodes and other light detectors, optical waveguides for communicating light elsewhere in base 10, the ends of other optical fibers, etc.

Optical fibers 20 are positioned on base 10 for the purpose of operatively coupling optical fibers 20 to mating structures 15. Grooves 12 are formed in base 10 to aid in aligning optical fibers 20 with the input/outputs of mating structures 15. However, in the broadest sense of the invention, grooves 12 are not necessary and optical fibers 20 are simply positioned on the surface of base 10. In instances where base 10 is used as a holding block, mating structures 15 are also simply positioned on the surface thereof. In instances where base 10 is a semiconductor substrate, grooves 12 are conveniently formed by etching or the like, possibly during another semiconductor manufacturing step. In this instance the mating structures may be formed in the substrate and grooves 12 may be formed during this process.

Base 10 is positioned in a magnetic field, which in this specific embodiment is a magnetic table 25. The lower surface of base 10 is positioned on the surface of magnetic table 25. Magnetic table 25 has associated therewith an electrical coil 26 which, when properly energized by a power source 27, produces a magnetic field with the lines of force (represented by arrow B) entering magnetic table 25 from above. Power source 27 is connected to coil 26 by means of a switch 28 so that the magnetic force can be easily controlled by an operator, automatic machinery (including a computer), etc. It will of course be understood that the magnetic field can be generated in a variety of ways and embodiments and table 25 is simply illustrated as one convenient embodiment which appears adaptable to a manufacturing scenario.

In the operation of the present invention, each optical fiber 20 is pre-coated along a section adjacent the end with a layer of magnetic material 21, such as nickel, iron cobalt, yitrium iron garnet (YIG), bismuth substituted gadolinium iron garnet, iron particle bearing plastic, etc. If optical fibers 20 are simply dipped or otherwise coated so as to also cover the ends, it will be necessary to provide clean ends, typically by cleaving and/or polishing, prior to proceeding with the coupling. Once optical fibers 20 are properly prepared, they are positioned on the upper surface of base 10 in abutting engagement with mating structures 15 and switch 28 is closed so that a magnetic force is produced which acts on magnetic material 21 to hold optical fibers 20 firmly in place. In some operations the optical circuit is energized and optical fibers 20 are further adjusted to produce the optimum coupling between optical fibers 20 and mating structures 15.

With optical fibers 20 held firmly in place by the magnetic force of table 25 acting on magnetic material 21, some form of fixing optical fibers 20 to mating structures 15 is initiated. In one embodiment the fixing step includes the application of any well known adhesive to optical fibers 20 to hold them fixedly in place. In embodiments where base 10 is a semiconductor substrate, a metal layer, which may be for example a magnetic material similar to material 21, is deposited in grooves 12, or on the surface of the substrate if grooves 12 are not used, and magnetic material 21 is fixedly attached to the metal layer by some convenient means, such as soldering, welding, etc. It will of course be understood that the semiconductor substrate can be doped to provide the necessary conducting paths. Also, in one embodiment the semiconductor substrate used includes III-V semiconductor material with lasers, photodetectors, optical amplifiers, etc. included in, positioned on, the substrate. In this embodiment, the semiconductor components formed in the substrate mate directly with optical fibers 20.

Thus, methods of operatively coupling one or more optical fibers to mating structures are disclosed utilizing a magnetic field to hold the optical fibers in place once they are properly positioned. These methods are especially useful when a plurality of optical fibers, or a fiber ribbon including a plurality of channels, is operatively coupled to a plurality of mating structures. These methods easily lend themselves to automatic assembly because no mechanical structures are required which would interfere with positioning mechanisms. Further, the magnetic coating can also be used as a portion of the fixed mounting in some embodiments.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A method of operatively coupling an optical fiber to a mating structure comprising the steps of:
   providing a base with a first major surface and a second major surface, opposite the first major surface and the mating structure positioned thereon;
   providing an optical fiber to be coupled to the mating structure;
   pre-coating a portion of the optical fiber adjacent an end thereof with a magnetic material;
   placing the pre-coated portion of the optical fiber with the end abutting the mating structure;
   applying a magnetic force to the base including placing the base with the second major surface resting on a magnetic surface having magnetic lines of force directed generally perpendicular to the major surfaces of the base, whereby the magnetic force is applied generally perpendicular to the optical fiber to hold the optical fiber in place; and
   fixing the optical fiber in coupling engagement with the mating structure.

2. A method of operatively coupling an optical fiber to a mating structure comprising the steps of:
   providing a base with the mating structure positioned thereon;
   providing an optical fiber to be coupled to the mating structure;
   pre-coating a portion of the optical fiber adjacent an end thereof with a magnetic material;
   placing the pre-coated portion of the optical fiber with the end abutting the mating structure;
   applying a magnetic force to the base, generally perpendicular to the optical fiber to hold the optical fiber in place; and
   fixing the optical fiber in coupling engagement with the mating structure including the steps of providing a metal layer on the base and soldering the precoating of magnetic material on the optical fiber to the metal layer on the base.

3. A method of operatively coupling an optical fiber to a mating structure comprising the steps of:
   providing a base including a semiconductor substrate with the mating structure positioned thereon;
   providing an optical fiber to be coupled to the mating structure;
   pre-coating a portion of the optical fiber adjacent an end thereof with a magnetic material;
   placing the pre-coated portion of the optical fiber with the end abutting the mating structure;
   applying a magnetic force to the base, generally perpendicular to the optical fiber to hold the optical fiber in place; and
   fixing the optical fiber in coupling engagement with the mating structure.

4. A method of operatively coupling an optical fiber to a mating structure as claimed in claim 2 wherein the step of providing a semiconductor substrate further includes forming the mating structure on the substrate.

5. A method of operatively coupling an optical fiber to a mating structure as claimed in claim 4 wherein the step of forming the mating structure includes forming a semiconductor component on the substrate.

6. A method of operatively coupling an optical fiber to a mating structure as claimed in claim 3 including in addition the steps of forming an elongated groove in the substrate aligned with the mating structure and placing the pre-coated portion of the optical fiber in the groove with the end abutting the mating structure.

7. A method of operatively coupling an optical fiber to a mating structure as claimed in claim 6 wherein the step of forming the mating structure includes forming an optical waveguide on the substrate with an end aligned with the groove in the substrate.

8. A method of operatively coupling an optical fiber to a mating structure as claimed in claim 6 wherein the step of forming an elongated groove includes the step of etching a groove in the substrate in alignment with an optical input to the semiconductor component.

* * * * *